Oct. 12, 1965  S. FEIN  3,211,944
ARC WELDING APPARATUS
Filed May 3, 1962
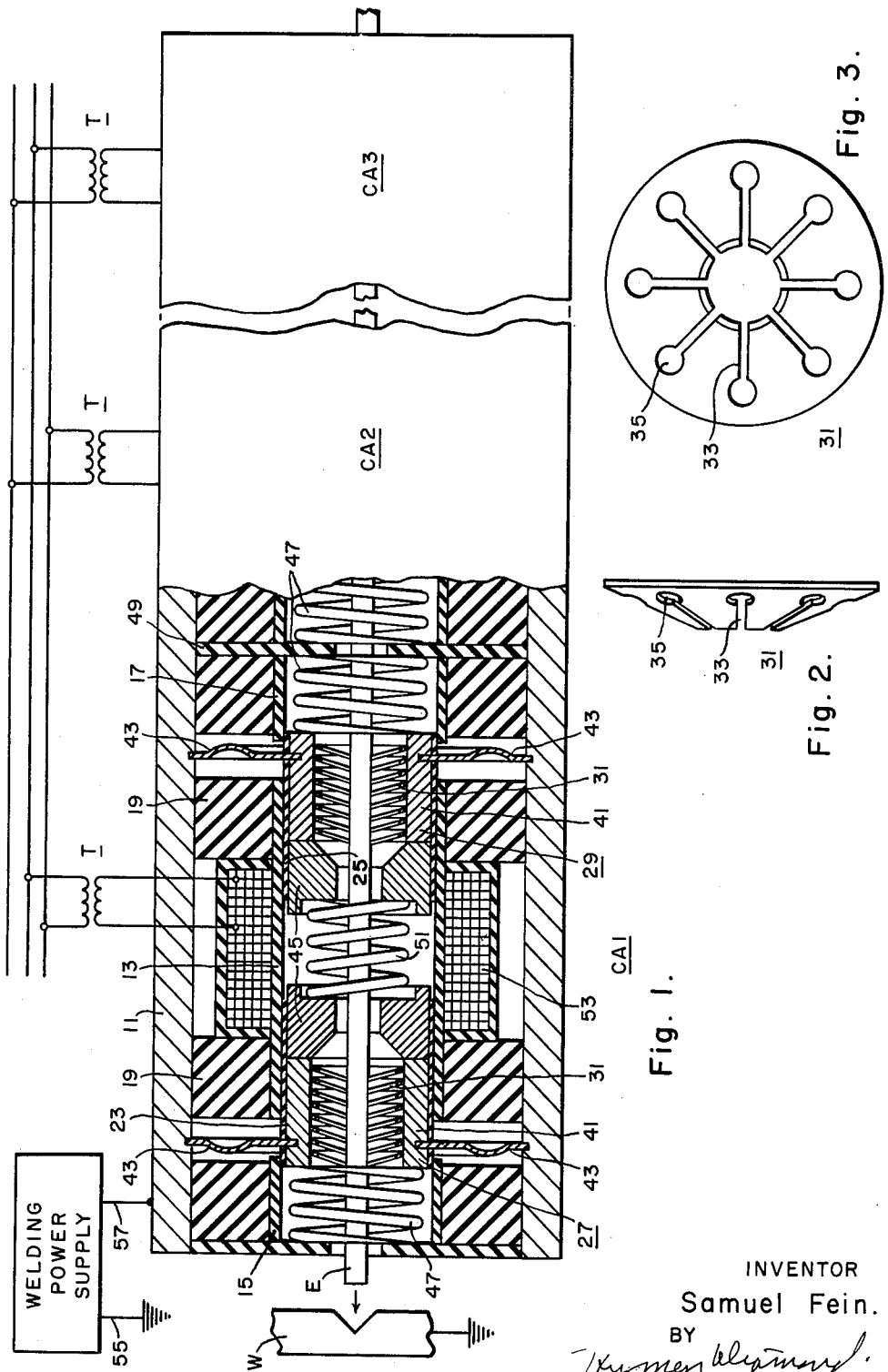
INVENTOR
Samuel Fein.
BY
ATTORNEY

United States Patent Office 3,211,944
Patented Oct. 12, 1965

3,211,944
ARC WELDING APPARATUS
Samuel Fein, North Huntingdon Township, Westmoreland County, Pa., assignor to Westinghouse Electric Corporation, East Pittsburgh, Pa., a corporation of Pennsylvania
Filed May 3, 1962, Ser. No. 192,152
3 Claims. (Cl. 314—68)

This invention relates to electric arc welding and has particular relationship to arc welding guns for advancing a welding electrode in arc welding relationship with work. This invention in its broader aspect is also applicable to arc melting and in its broadest aspects to the advancing of wires for general purposes. To the extent that this invention is applicable to arc melting reference to arc welding or the like in the claims is intended to include arc melting within its scope.

In arc welding guns in accordance with the teachings of the prior art the electrode is advanced by motor driven rollers through an electrode guide which is typically an elongated copper tube. The welding current is supplied to the electrode through its contact with the guide tube. In such guns the regions of contact of the electrode and the guide tube changes continuously as the curvatures in the portion of the electrode in the guide tube change; at times the electrode may, for short intervals be disconnected entirely from the guide to tube. The electrical resistance of the contact through which the welding current is transmitted thus changes continuously and has been found to affect the quality of the weld particularly in the welding of such materials as aluminum, zirconium and titanium and their alloys. In addition interruption of the contact between the electrode and the guide tube or at the drive rollers produces arcing or sparking between the electrode and the adjacent gun parts. The small sparks melt off tiny particles of metal from the gun parts and inject them into the surface of the electrode and also decompose the electrode surface and produce compounds such as oxides in the surface. This leads to contamination of the weld.

It is an object of this invention to provide a welding gun or torch which shall not have the above described deficiencies.

Attempts have been made to provide a gun in which the electrode passes through a spring actuated contact in the vicinity of the electrode terminal of the arc. Electrode contact means of this type has the difficulty that it requires a spring capable of withstanding the heat developed at the arc. Materials for such springs are highly costly and even to the extent that they can be procured the life of the spring is relatively short.

It is then an object of this invention to provide an arc-welding gun or torch in the operation of which the electrical contact resistance, through which the welding current passes, between the contact element of the torch and the electrode transmitted through the torch shall be of low magnitude and substantially contant and contamination by reason of arcing between the contact making element or other parts of the gun and the electrode shall be suppressed.

It is another object of this invention to provide an arc-welding gun or torch in which the welding current is predominately transmitted through contacts which move with, and are then stationary, relative to, the electrode.

An incidental object of this invention is to provide novel apparatus for advancing a wire continuously.

In accordance with the specific aspects of this invention the electrode is advanced by a plurality of pairs of reciprocable contact elements which also serve to transmit welding current through the electrode. The contact elements are formed to advance the electrode while they are moving in only one direction and to slide over the electrode in the opposite direction. The contact elements are positioned so that when one element is moved in one direction it slides over the electrode and when the other element is moved in this one direction it advances the electrode; conversely, when the first element is moved in the opposite direction it advances the electrode and when the other element is moved in the opposite direction it slides over the electrode. The contact elements are reciprocated by electromagnetic means in opposite directions so that one of the elements is advancing the electrode while the other element is sliding relative to the electrode. The contact elements are connected in parallel with the power supply so that the element in advancing engagement with the electrode, which is in firm electrical contact with the electrode, shunts the element which is sliding relative to the electrode. Thus, any irregularity in the position of the sliding contact element does not produce arcing as the potential between a disengaged contact element and the electrode relative to which it is sliding is low because of the shunting element in advancing engagement with the electrode.

In the practice of the specific aspects of this invention the contact elements are connected to oppositely disposed cores of magnetizable but readily demagnetizable material; for example, the cores may be composed of soft iron. The cores are subjected to the magnetic field produced by a coil and are moved in opposite directions by alternating current transmitted through the coil. When the coil is energized the cores are attracted drawing the contact elements towards each other. During this movement one of the elements slides relative to the electrode and the other advances the electrode. During the portions of the alternating current cycle during which the magnetizing current through the coil is substantially zero the cores are retracted preferably by springs and reverse the motion of the contact element so that the contact element which originally advanced the electrode now slides relative to it and the other contact element advances the electrode. Continuous advancing of the electrode is achieved by providing a plurality of sets of pairs of contact elements each energized from a separate coil and each coil energized from a potential displaced in phase with reference to the potential energizing the other coils. Thus the reciprocations of the contact elements are displaced in phase but overlap so that during operation the electrode is at all times advanced by one or more of the sets of elements.

The coils may be energized from a single phase supply, one coil being directly connected to the supply and the other coil being connected through a de-phasing capacitor. The displacement in phase between the potentials impressed on such two coils may be of the order of 45°.

The novel features considered characteristic of this invention are disclosed generally above. The invention itself, both as to its organization and as to its method of operation, together with additional objects and advantages thereof will be better understood from the following description of a specific embodiment.

FIGURE 1 is a view in longitudinal section of a preferred embodiment of this invention;

FIG. 2 is a view in end elevation of the principal component of a contact element used in the practice of this embodiment; and FIG. 3 is a view in side elevation of this element.

In the drawing, this invention is shown as applied to the welding of work W with an electrode E. The apparatus includes a gun, a welding power supply and a poly-phase supply for actuating the gun.

The gun includes an outer casing 11 which typically may be composed of a conducting material such as copper or brass and may conveniently be circularly cylindrical. Within the casing 11 a plurality of contact assemblies CA1, CA2 and CA3 are provided. Each such assembly is disposed within outer longitudinal circularly cylindrical shells 13, 15, 17 separated from the casing 11 by circularly cylindrical spacers 19. Within the outer shells 13 and 15 and 13 and 17 a plurality of relatively thin inner shells 23 and 25 are mounted. The thin shells 23 and 25 are composed of a material having a low coefficient of friction.

Each contact assembly CA1, CA2, CA3, includes a pair of contact elements 27 and 29. Each element is made up of a plurality of conducting leaves 31, shown in FIGS. 2 and 3. Each leaf 31 is of generally truncated conical form and includes a plurality of slots 33, each slot converging from a hole 35 of generally elliptical form to the opening of the lower area base of the truncated cone. The portions of the leaves between the slots 33 have substantial resilience. The openings 35 serve to conduct a cooling or shielding gas through the gun.

Each contact element 27, 29 includes a plurality of the leaves 31 secured at the periphery of greater area to an annular conductor 41 which may be composed of copper and which is mounted readily slidable in the associated inner shell 23, 25. The leaves 31 of the contact elements 27, 29 are arranged generally parallel with the leaves in engagement with the electrode E along their smaller diameter periphery. The leaves may be provided at their smaller-diameter periphery with an electrical contact material or may be composed of this material throughout. Each conducting annulus 41 is connected to the casing 11 through a resilient diaphragm 43 which permits movement of the annulus relative to the inner shell 23, 25.

Each annulus 41 is secured to a generally annular core 45 of a readily magnetizable and readily demagnetizable material. The opening in the core 45 may be generally cylindrical flaring out conically towards the associated annulus 41. The diameter of the opening in the core 45 at the annulus 41 may be approximately equal to the inner diameter of the annulus. The shielding or cooling gas may flow through the opening in the cores 45 and thence through the openings 35 in the leaves 31. Each core 45 is slidable with the associated annulus 41 along the contiguous inner shell 23 or 25.

The core 45 and annulus 41 of each pair of contact assemblies are mounted oppositely to each other and are urged towards each other by compression springs 47 engaging the associated annulus 41 at one end and a partition plate 49 extending from the casing at the other. The core-annulus assemblies of each pair of contact assemblies CA1, CA2, CA3 are urged away from each other by a spring 51 which engages the opposite surfaces of the cores 45.

Each pair of cores 45 may be actuated by the field of a solenoid 53. Each solenoid is connected to a different phase of the polyphase supply through a transformer T.

The welding power supply may be of any suitable type. One terminal 55 of this supply is grounded; the other terminal 57 is connected to the casing 11. The casing is connected through the diaphragms 43 to the annulus 41 and through the annulus to the leaves 31 of the contact elements 27, 29. The leaves 31 are connected to the electrode E. The work W is grounded so that the welding power supply is thus connected to produce an arc between the electrode E and the work.

In the use of the apparatus the welding power supply and the polyphase supply are energized. Currents displaced in phase are then transmitted through the different coils 53. Consider one of the coils 53 and assume that the current flowing through it is increasing from the zero magnitude. The associated cores 45 are then moved towards each other against the action of the spring 51 aided by the energy stored in the springs 47. The movement of the cores 45 causes the contact element 27 moving away from the work W to slide relative to the electrode E and the contact element 29 moving towards the work W to engage the electrode and advance it towards the work W. The spring 51 is compressed so that energy is stored in it.

When the current in the coil 53 decreases to zero the stored energy in the spring 51 causes the cores 45 to move away from each other and to compress springs 47 to store energy in them. The contact element 27 which originally engaged the electrode E in sliding relationship now engages and advances the electrode and the other contact element 29 slides relative to the electrode.

The operation described above continues so long as the coil remains energized by alternating current. Since the cores 45 are of readily demagnetizable material the above described operation is repeated during each half period. There are thus for a single-phase commercial frequency (60 cycle) supply 240 movements advancing the electrode per second; 120 of these movements may be regarded as essentially electrical since they are produced by the movement of the cores under the magnetic field of the coil and the other 120 of these movements may be regarded as essentially mechanical since they are produced by the stored energy in the spring 53 between the coils. Because of the energy storage effect of the springs 47 and 51 the core current need not be high.

The sliding of the contact element 27 or 29 relative to the electrode E does not result in contamination by reason of arcing because the sliding contact element is shunted by a contact element which is at the same time in advancing engagement with the electrode and thus firmly contacts the electrode. Since the firm contacts shunt the sliding contacts the potential which might occur between the sliding contact element and the electrode when the elements are separated from the electrode E is relatively small. The contact elements 27 and 29 in turn move with the electrode E while they are advancing the electrode and are thus stationary relative to the electrode.

Since the coils of the different contact assemblies are energized from the different phases of the polyphase supply their reciprocation is displaced in phase and the advancing of the electrode by the corresponding contact elements 27 and 29 of each pair overlaps so that the movement of the electrode is continuous and not intermittent.

While a preferred embodiment of this invention has been disclosed herein, many modifications thereof are feasible. This invention then is not to be restricted except insofar as is necessitated by the spirit of the prior art.

I claim as my invention:

1. A continuous wire feeder including a plurality of pairs of wire engaging means, each said means including a first reciprocable wire-engaging element in wire-advancing engagement with said wire when said element is moved in one direction and slidable along said wire when said element is moved in the opposite direction, a second reciprocable wire-engaging element in wire-advancing engagement with said wire when said second element is moved in said one direction and slidable relative to said wire when said second element is moved in said opposite direction, electromagnetic means connected to each of said pairs of elements for reciprocating said elements of each pair oppositely to each, an element of each pair moving alternately in said one direction and said opposite direction while the other element of said last-named pair moves alternately in said opposite direction and said one direction respectively, and means connected to the different electromagnetic means connected to said different pairs for supplying pulsating current displaced in phase to said different electromagnetic means to reciprocate said pairs as aforesaid in different phase relationship.

2. A gun for arc welding with a consumable electrode characterized by that the electrode is advanced and current is conducted to said electrode by at least a pair of reciprocable contact elements in parallel welding-current conducting engagement with said electrode, means connected to both said elements for exerting a first force on said elements to advance said elements towards each other to a first position while maintaining said engagement and means connected to both said elements for exerting a second force on said elements to retract said elements away from each other from said first position to a second position, each element sliding relative to said electrode while moving in the direction away from the welding arc and advancing said electrode while moving in the direction towards the welding arc, during the exertion of said first force, one of said elements being at all times, during the movement of said elements, in advancing engagement with said electrode and the other in sliding engagement, and during the exertion of said second force said other element being at all times, during the movement of said elements, in advancing engagement with said electrode and said one element being in sliding engagement with said electrode.

3. Arc welding apparatus for welding work with a power supply with a consumable electrode, including a pair of movable means engaging said electrode, means connected to both said movable means for exerting a first force on said elements to advance said elements toward each other to a first position while maintaining said engagement, means connected to both said elements for exerting a second force on said elements to retract said elements away from each other to a second position, each element in its turn sliding relative to said electrode while moving in the direction away from the welding arc and in its turn advancing said electrode while moving in the direction towards the welding arc, and means connected to at least one of said movable means for supplying current to said electrode.

References Cited by the Examiner
UNITED STATES PATENTS

| | | | |
|---|---|---|---|
| 307,062 | 10/84 | Newton | 314—67 X |
| 411,713 | 9/89 | Cox | 314—67 X |
| 1,963,915 | 6/34 | Kennedy et al. | 314—68 |
| 2,133,971 | 10/38 | Christensen et al. | 314—68 |
| 3,128,369 | 4/64 | Pilia et al. | 219—130 X |

RICHARD M. WOOD, *Primary Examiner.*

JOSEPH V. TRUHE, *Examiner.*